US008612818B2

(12) United States Patent
Cai et al.

(10) Patent No.: US 8,612,818 B2
(45) Date of Patent: *Dec. 17, 2013

(54) HYBRID AUTOMATIC REPEAT REQUEST ASSOCIATIONS FOR DOWNLINK SEMI-PERSISTENT SCHEDULING

(71) Applicant: Research In Motion Limited, Waterloo (CA)

(72) Inventors: Zhijun Cai, Euless, TX (US); Yi Yu, Irving, TX (US); James Earl Womack, Bedford, TX (US); Takashi Suzuki, Ichikawa (JP)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/790,392

(22) Filed: Mar. 8, 2013

(65) Prior Publication Data

US 2013/0188586 A1 Jul. 25, 2013

Related U.S. Application Data

(63) Continuation of application No. 13/611,956, filed on Sep. 12, 2012, now Pat. No. 8,429,477, which is a continuation of application No. 12/479,610, filed on Jun. 5, 2009, now Pat. No. 8,307,250.

(60) Provisional application No. 61/059,468, filed on Jun. 6, 2008.

(51) Int. Cl.
G08C 25/02 (2006.01)
H04L 1/18 (2006.01)

(52) U.S. Cl.
USPC .......................................... 714/748

(58) Field of Classification Search
None
See application file for complete search history.

(56) References Cited

U.S. PATENT DOCUMENTS 8,031,583 B2 10/2011 Classon et al.
2003/0123470 A1 7/2003 Kim et al.
(Continued)

FOREIGN PATENT DOCUMENTS

EP 1545040 A1 6/2005
WO 2007044414 A1 4/2007
(Continued)

OTHER PUBLICATIONS

3GPP TSG-RAN WG1 #62; "Re-Transmission of Persistent Scheduling"; R2-082260; May 5-9, 2008; Kansas City, USA; 5 pages.

(Continued)

Primary Examiner — Guerrier Merant
(74) Attorney, Agent, or Firm — Conley Rose, P.C.; J. Robert Brown, Jr.; Maria L. Sekul

(57) ABSTRACT

Disclosed is a user equipment in a wireless communication system, configured to receive a first initial transmission associated with a first Hybrid Automatic Repeat Request (HARQ) process; receive a second initial transmission associated with a second HARQ process; and receive at least one retransmission associated with the first HARQ process, wherein when the second initial transmission occurs before the at least one retransmission, the second HARQ process assigned an HARQ process ID that is different from an HARQ process ID assigned to the first HARQ, and wherein when the second initial transmission occurs after the at least one retransmission, the second HARQ process assigned an HARQ process ID that is the same as an HARQ process ID assigned to the first HARQ process.

20 Claims, 8 Drawing Sheets

(56) References Cited

U.S. PATENT DOCUMENTS

| | | | |
|---|---|---|---|
| 2003/0147348 | A1 | 8/2003 | Jiang |
| 2005/0249120 | A1 | 11/2005 | Heo et al. |
| 2007/0058595 | A1 | 3/2007 | Classon et al. |
| 2008/0240014 | A1 | 10/2008 | Chang et al. |
| 2009/0073932 | A1 | 3/2009 | McBeath et al. |
| 2009/0103500 | A1 | 4/2009 | Malkamaki et al. |
| 2009/0287976 | A1 | 11/2009 | Wang et al. |
| 2010/0074215 | A1 | 3/2010 | Park et al. |
| 2011/0069667 | A1 | 3/2011 | Grovlen et al. |
| 2011/0194502 | A1 | 8/2011 | Sung et al. |

FOREIGN PATENT DOCUMENTS

| | | | |
|---|---|---|---|
| WO | 2008024890 | A2 | 2/2008 |
| WO | 2009020363 | A1 | 2/2009 |
| WO | 2009053930 | A2 | 4/2009 |
| WO | 2009114401 | A1 | 9/2009 |
| WO | 2009115904 | A2 | 9/2009 |

OTHER PUBLICATIONS

Canadian Office Action; Application No. 2,726,829; Apr. 9, 2013; 2 pages.
Chinese Office Action; Application No. 200980130682.5; Jan. 22, 2013; 11 pages.
Canadian Office Action; Application No. 2,726,981; Mar. 26, 2013; 2 pages.
Chinese Office Action; Application No. 200980130683.X; Feb. 16, 2013; 14 pages.
Canadian Office Action; Application No. 2,731,010; Mar. 28, 2013; 2 pages.
European Examination Report; Application No. 09790599.6; Mar. 13, 2013; 5 pages.
European Examination Report; Application No. 11165646.8; Mar. 13, 2013; 5 pages.
Cai, Zhijun, et al.; U.S. Appl. No. 12/479,610; Title: Hybrid Automatic Repeat Request Associations for Downlink Semi-Persistent Scheduling; Filing Date: Jun. 5, 2009.
Cai, Zhijun, et al.; U.S. Appl. No. 12/479,556; Title: Signaling Reserved Hybrid Automatic Repeat Request Information for Downlink Semi-Persistent Scheduling; Filing Date: Jun. 5, 2009.
Cai, Zhijun, et al.; U.S. Appl. No. 12/505,330; Title: Hybrid Automatic Repeat Request Process Mapping Rule; Filing Date: Jul. 17, 2009.
Cai, Zhijun, et al.; U.S. Appl. No. 13/611,956; Title: Hybrid Automatic Repeat Request Associations for Downlink Semi-Persistent Scheduling; Filing Date: Sep. 12, 2012.
Cai, Zhijun, et al.; U.S. Appl. No. 13/666,419; Title: Signaling Reserved Hybrid Automatic Repeat Request Information for Downlink Semi-Persistent Scheduling; Filing Date: Nov. 1, 2012.
3GPP TS 36.300V8.8.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Mar. 2009; 157 pgs.
3GPP TS 36.321V8.5.0; 3rd Generation Partnership Project; Technical Specification Group Radio Access Network; Evolved Universal Terrestrial Radio Access (E-UTRA) Medium Access Control (MAC) Protocol Specification; Release 8; Mar. 2009; 46 pgs.
3GPP TS 36.331V8.5.0; 3rd Generation Partnership Project; Technical Specification Group Radio Access Network; Evolved Universal Terrestrial Radio Access (E-UTRA) Radio Resource Control (RRC); Protocol Specification; Release 8; Mar. 2009; 204 pages.
3GPP TSG RAN WG2 #60; Nortel; Title: HARQ Process Id's for DL Persistent Scheduling; R2-075153; Jeju, South Korea; Nov. 5-9, 2007; 5 pgs.
3GPP TSG-RAN WG2 #62; Huawei; Title: HARQ Process Id of DL Persistent Scheduling; R2-082215; Kansas City, USA; May 5-9, 2008; 3 pgs.
3GPP TSG-RAN WG2 #62bis; Research in Motion, Ltd.; Title: Considerations for HARQ Associations for DL SPS; R2-083433; Warsaw, Poland; Jun. 30-Jul. 4, 2008; 3 pgs.
3GPP TSG-RAN WG2 Meeting #62; Ericsson; Title: Remaining Issues in Semi Persistent Scheduling; R2-082153; Kansas City, US; May 5-9, 2008; 2 pgs.
3GPP TSG-RAN WG2 Meeting #62; Nokia Corporation, Nokia Siemens Networks; Title: Persistent Scheduling for DL; R2-082302; Kansas City, USA; May 5-9, 2008; 6 pgs.
3GPP TSG-RAN2 Meeting #62bis; Samsung; Title: HARQ Retransmissions for the DL Persistent Scheduling; R2-083501; Warsaw, Polland; Jun. 30-Jul. 4, 2008; 2 pgs.
CATT; Title: Process ID Allocation for Downlink Persistent Scheduling; R2-080719; Feb. 11, 2008; 5 pgs.
LG Electronics; Title: Alternative Uplink Synchronous HARQ Schemes; 3GPP TSG RAN WG1 #46 bis; R1-062573; Seoul, Korea; Oct. 9-13, 2006; 4 pgs.
Research in Motion Limited; TSG-RAN WG2 #63; Title: Considerations for HARQ Associations for DL SPS; R2-084313; Jeju, Korea; Aug. 18-22, 2008; 4 pgs.
Office Action dated Jan. 9, 2012; U.S. Appl. No. 12/479,610, filed Jun. 5, 2009; 30 pages.
Final Office Action dated Jun. 5, 2012; U.S. Appl. No. 12/479,610, filed Jun. 5, 2009; 19 pages.
Notice of Allowance dated Jul. 19, 2012; U.S. Appl. No. 12/479,610, filed Jun. 5, 2009; 9 pages.
Office Action dated Feb. 17, 2012; U.S. Appl. No. 12/479,556, filed Jun. 5, 2009; 25 pages.
Final Office Action dated Aug. 16, 2012; U.S. Appl. No. 12/479,556, filed Jun. 5, 2009; 13 pages.
Notice of Allowance dated Oct. 19, 2012; U.S. Appl. No. 12/479,556, filed Jun. 5, 2009; 13 pages.
Office Action dated Jun. 22, 2012; U.S. Appl. No. 12/505,330, filed Jun. 22, 2012; 45 pages.
Final Office Action dated Nov. 5, 2012; U.S. Appl. No. 12/505,330, filed Jun. 22, 2012; 22 pages.
Office Action dated Feb. 22, 2013; U.S. Appl. No. 12/505,330, filed Jun. 22, 2012; 25 pages.
Office Action dated Oct. 30, 2012; U.S. Appl. No. 13/611,956, filed Sep. 12, 2012; 22 pages.
Notice of Allowance dated Jan. 23, 2013; U.S. Appl. No. 13/611,956, filed Sep. 12, 2012; 13 pages.
PCT International Search Report; PCT Application No. PCT/US2009/046485; Oct. 1, 2009; 4 pgs.
PCT Written Opinion of the International Searching Authority; PCT Application No. PCT/US2009/046485; Oct. 1, 2009; 6 pgs.
PCT International Preliminary Report on Patentability; Application No. PCT/US2009/046845; Dec. 6, 2010; 8 pages.
European Examination Report; Application No. 09759558.1; Dec. 5, 2011; 6 pages.
PCT International Search Report; PCT Application No. PCT/US2009/046469; Dec. 4, 2009; 4 pgs.
PCT Written Opinion of the International Searching Authority; PCT Application No. PCT/US2009/046469; Dec. 4, 2009; 4 pgs.
PCT International Preliminary Report on Patentability; Application No. PCT/US2009/046469; Dec. 6, 2010; 5 pages.
European Examination Report; Application No. 09759543.3; Aug. 11, 2011; 4 pages.
Japanese Office Action; Application No. 2011-512707; Mar. 30, 2012; 4 pages.
Mexican Office Action; Application No. MX/a/2010/013338; Feb. 27, 2012; 2 pages.
Mexican Office Action; Application No. MX/a/2010/013338; Nov. 8, 2012; 4 pages.
PCT International Search Report; PCT Application No. PCT/US2009/051040; Apr. 28, 2010; 4 pgs.
PCT Written Opinion of the International Searching Authority; PCT Application No. PCT/US2009/051040; Apr. 28, 2010; 6 pgs.
PCT International Preliminary Report on Patentability; Application No. PCT/US2009/051040; Nov. 12, 2010; 10 pages.
European Examination Report; Application No. 09790599.6; Jul. 22, 2011; 4 pages.

(56) References Cited

OTHER PUBLICATIONS

European Examination Report; Application No. 09790599.6; Jun. 13, 2012; 6 pages.
Japanese Office Action; Application No. 2011-518944; Aug. 23, 2012; 4 pages.
Korean Office Action; Application No. 10-2011-7003606; Oct. 28, 2011; 8 pages.
Mexican Office Action; Application No. MX/a/2011/000680; Sep. 18, 2012; 7 pages.
European Extended Examination Report; Application No. 11165646.8; Jul. 25, 2011; 6 pages.
European Examination Report; Application No. 11165646.8; Jun. 11, 2012; 6 pages.
Chinese Office Action; Application No. 200980136760.2; Apr. 11, 2013; 12 pages.
Mexican Office Action; Application No. MX/a/2011/000680; Jun. 17, 2013; 4 pages.
Final Office Action dated Sep. 5, 2013; U.S. Appl. No. 12/505,330, filed Jun. 22, 2012; 34 pages.
Office Action dated Aug. 16, 2013; U.S. Appl. No. 13/666,419, filed Nov. 1, 2012; 28 pages.
European Summons to Attend Oral Proceedings; Application No. 09759543.3; Aug. 14, 2013; 7 pages.
Chinese Office Action; Application No. 200980130682.5; Aug. 21, 2013; 11 pages.

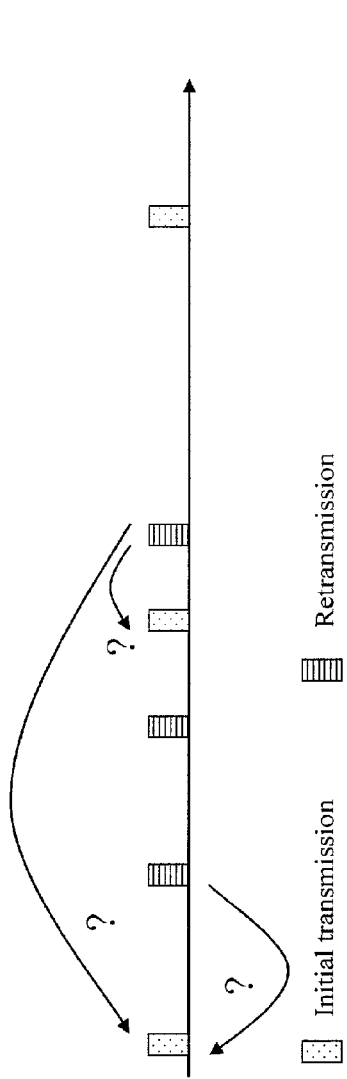
Figure 8a. HARQ Process ID Ambiguity (2 cases)
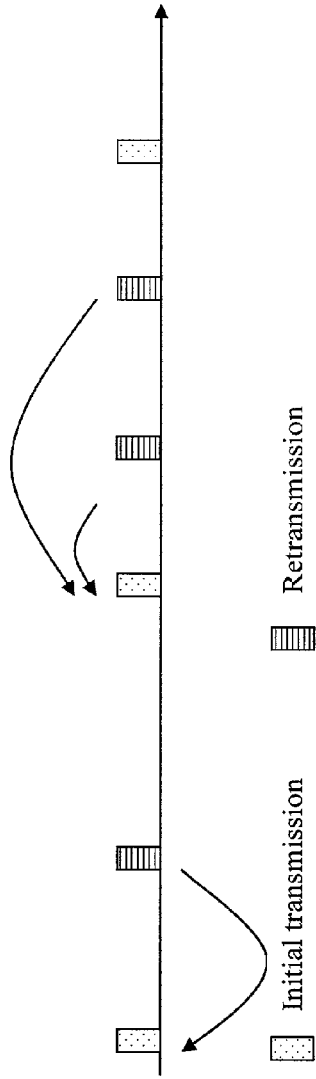
Figure 8b. Maximum number of retransmissions is less than 2

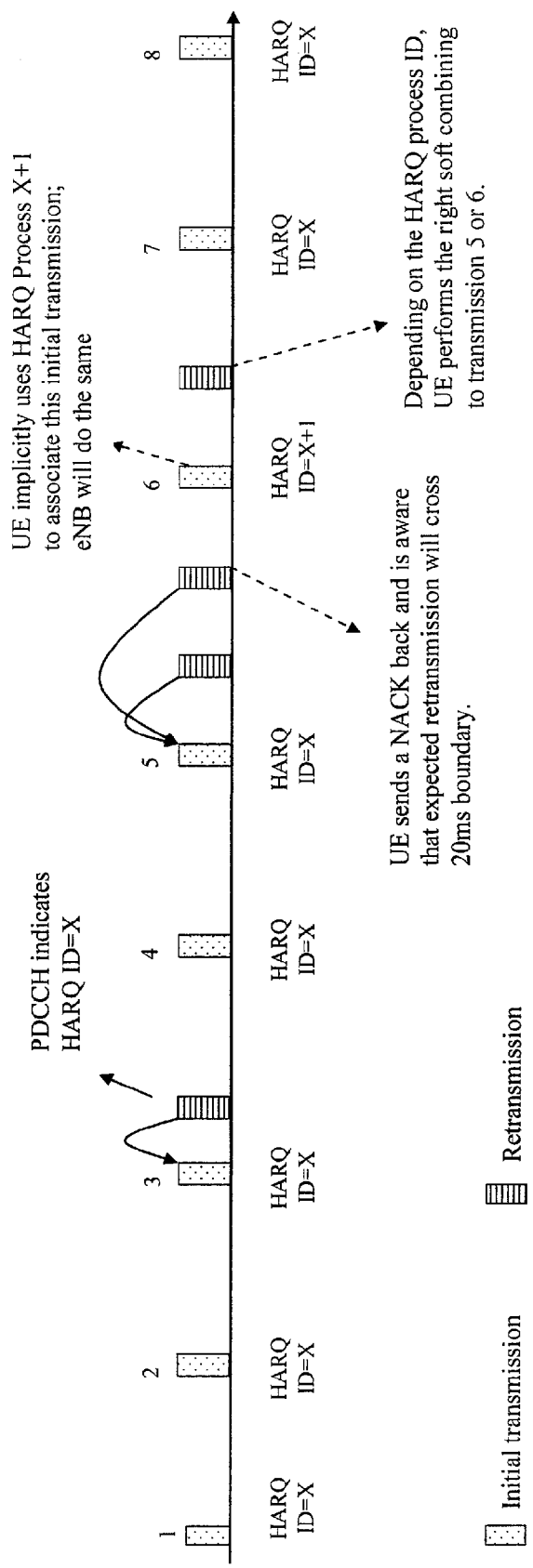
Figure 8c. Implicit dynamic assignment for the additional HARQ process to resolve the second case

HYBRID AUTOMATIC REPEAT REQUEST ASSOCIATIONS FOR DOWNLINK SEMI-PERSISTENT SCHEDULING

BACKGROUND

As used herein, the terms "user agent" and "UA" can refer to mobile devices such as mobile telephones, personal digital assistants, handheld or laptop computers, and similar devices that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar capabilities but that are not transportable, such as fixed line telephones, desktop computers, set-top boxes, or network nodes. When a UA is a network node, the network node could act on behalf of another function such as a wireless device or a fixed line device and simulate or emulate the wireless device or fixed line device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session. The terms "UA" and "user equipment" or "UE" might be used interchangeably herein.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station or an LTE ENB, that can provide a UA with access to other components in a telecommunications system.

For a wireless Voice over Internet Protocol (VoIP) call, the signal that carries data between a UA and an access device can have a specific set of frequency, time, and coding parameters and other characteristics that might be specified by the access device. A connection between a UA and an access device that has a specific set of such characteristics can be referred to as a resource. An access device typically establishes a different resource for each UA with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 8a, 8b, and 8c are alternative illustrations of data transmissions and retransmissions according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The procedure of determining resource capacity one time and then periodically allocating substantially the same resource capacity can be referred to as semi-persistent scheduling (also referred to as configured scheduling). In semi-persistent scheduling, there is no PDCCH (Physical Downlink Control Channel) notification about recurring resource availability for a UA; hence the signaling overhead in both the uplink and the downlink is reduced. That is, in semi-persistent scheduling, the resource capacity provided to multiple data packets on a resource is allocated based on a single scheduling request.

Hybrid Automatic Repeat Request (HARQ) is an error control method sometimes used in digital telecommunications, including data transmissions that use semi-persistent scheduling. In HARQ, additional error detection and correction bits are added to a data transmission. If the recipient of the transmission is able to successfully decode the additional bits, then the recipient accepts the data block associated with the additional bits. If the recipient is not able to decode the additional bits, the recipient might request a retransmission.

Figure 1:
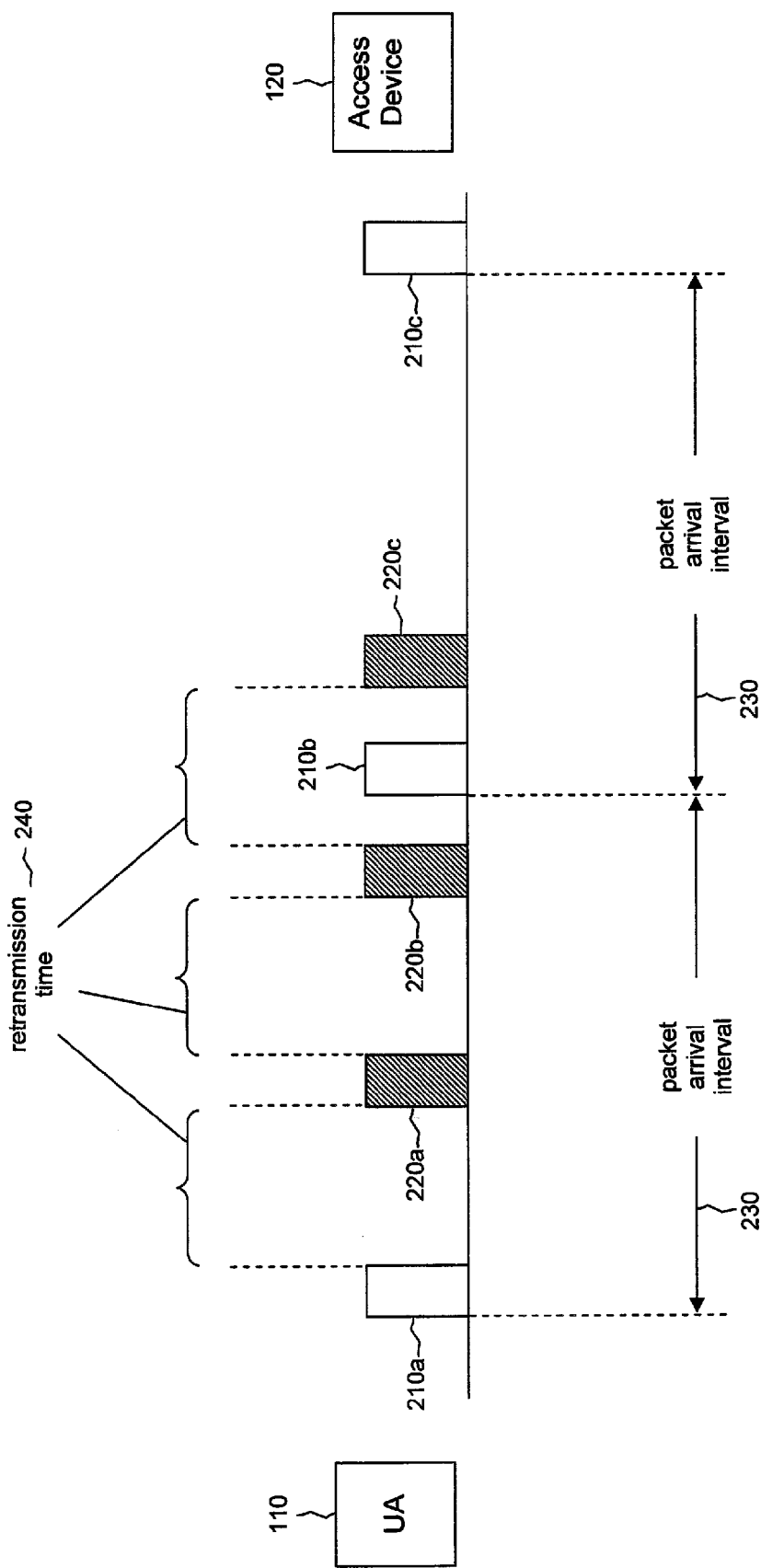
FIG. 1 is an illustration of data transmissions and retransmissions according to an embodiment of the disclosure.

FIG. 1 illustrates a series of data transmissions from an access device 120 to a UA 110. The data transmissions include initial transmissions 210 and retransmissions 220 that occur when the UA 110 does not successfully receive one or more initial transmissions 210. The initial transmissions 210 include the HARQ error detection bits and occur at periodic packet arrival intervals 230, typically 20 milliseconds. Upon receiving an initial transmission 210, the UA 110 attempts to decode the error detection bits. If the decoding is successful, the UA 110 accepts the data packet associated with the initial data transmission 210 and sends an acknowledgement (ACK) message to the access device 120. If the decoding is unsuccessful, the UA 110 places the data packet associated with the initial data transmission 210 in a buffer and sends a non-acknowledgement (NACK) message to the access device 120.

If the access device 120 receives a NACK message, the access device 120 sends a retransmission 220 of the initial transmission 210. The retransmissions 220, like the initial transmissions 210, include HARQ error detection bits. If the decoding of a retransmission 220 together with its corresponding initial transmission 210 is unsuccessful, the UA 110 might send another NACK message, and the access device might send another retransmission 220. The UA 110 typically combines an initial transmission 210 and its corresponding retransmissions 220 before the decoding. The interval between an initial transmission 210 and its first retransmission 220 or between two retransmissions 220 is typically about seven to eight milliseconds and can be referred to as the retransmission time 240.

The process of the access device 120 sending the UA 110 an initial transmission 210, waiting for an ACK or NACK message from the UA 110, and sending a retransmission 220 when a NACK message is received can be referred to as a HARQ process. The access device 120 can support only a limited number of HARQ processes, typically eight. Each HARQ process is given a unique ID, and a particular HARQ process might be reserved for the exclusive use of one series of data transmissions. For example, if HARQ process 1 is reserved for a series of semi-persistently scheduled transmissions, no other transmissions can use HARQ process 1.

A HARQ process ID might be designated via the PDCCH. However, semi-persistently scheduled initial transmissions 210 are not assigned in the PDCCH and therefore have no associated HARQ process ID. Only the retransmissions 220 are assigned a HARQ process ID. This could cause some ambiguity in the determination of a linkage between an initial transmission 210 and a retransmission 220. That is, when the UA 110 receives a retransmission 220, the UA 110 might not know whether the retransmission 220 is a retransmission of the most recent initial transmission 210 or a retransmission of a prior initial transmission 210.

This can be illustrated in FIG. 1, where it can be assumed that the UA 110 does not successfully receive a first initial transmission 210a. The UA 110 then sends a NACK to the access device 120. Upon receiving the NACK, the access device 120 sends the UA 110 a first retransmission 220a. The UA 110 does not successfully receive the first retransmission 220a and sends another NACK. The access device 120 then sends a second retransmission 220b, which the UA 110 again does not successfully receive. The UA 110 sends a third NACK, and the access device 120 sends a third retransmission 220c.

Since a HARQ process ID is explicitly signaled over the PDCCH for each of the retransmissions 220 but not to the initial transmission 210a, it may not be clear that the retransmissions 220 are associated with the initial transmission 210a. A simple way to resolve this issue is to reserve a HARQ process for all of the initial transmissions 210 and retransmissions 220 for the duration of a session between the access device 120 and the UA 110. In this way, the UA 110 would know that retransmissions 220a and 220b, for example, are associated with the initial transmission 210a.

However, some ambiguity might still exist with regard to the third retransmission 220c, since that retransmission takes place after a second initial transmission 210b. With all of the initial transmissions 210 and retransmissions 220 using the same HARQ process ID, it would not be clear whether the third retransmission 220c was associated with the first initial transmission 210a or the second initial transmission 210b. This issue might be resolved by reserving two HARQ processes and assigning them to alternating initial transmissions 210. If the UA 110 and the access device 120 are both aware that the two HARQ processes have been reserved in this manner, they can resolve which retransmissions 220 are associated with which initial transmissions 210.

While reserving HARQ resources can reduce ambiguity, it can also introduce inefficiency. When eight HARQ resources are available, reserving one HARQ resource can reduce peak data throughput by 12.5%, and reserving two HARQ resources can reduce peak data throughput by 25%. A 12.5% reduction in peak data throughput might be an acceptable tradeoff to ensure that the first retransmission 220a, for example, is associated with the first initial transmission 210a, since at least one retransmission 220 typically occurs for approximately 10 to 15% of initial transmissions. However, the 25% reduction in data throughput introduced by the reservation of a second HARQ resource may be excessive. The second HARQ resource can decrease ambiguity when a third retransmission 220c occurs, but a third retransmission 220c is very unlikely. For example, a third retransmission 220c typically occurs for only about 2 to 3% of initial transmissions. Such a rare event may not warrant such a large reduction in throughput.

Since the packet arrival interval 230 is typically 20 milliseconds, and the retransmission time 240 is typically 8 milliseconds, the first retransmission 220a and the second retransmission 220b will typically occur between the first initial transmission 210a and the second initial transmission 210b, and the third retransmission 220c will typically occur after the second initial transmission 210b. If the number of retransmissions 220 for an initial transmission 210 is limited to two, then the ambiguity associated with the third retransmission 220c is eliminated, and the reservation of only one HARQ process can ensure that the retransmissions 220a and 220b are associated with the appropriate initial transmission 210a.

However, there may be circumstances where the number of retransmissions 220 for an initial transmission 210 is not limited to two. For example, near a cell edge, the third retransmission 220c may be needed. If the number of retransmissions 220 for an initial transmission 210 is not limited to two, it may be desirable to resolve the ambiguity associated with the third retransmission 220c in a manner that does not involve an ongoing reservation of a second HARQ process.

The UA 110 and the access device 120 are both aware of the number of NACK messages that the UA 110 has sent, the number of retransmissions 220 the access device 120 has sent, the size of the packet arrival interval 230, and the length of the retransmission time 240. With this information, the UA 110 and the access device 120 can both recognize when a retransmission 220 associated with a first initial transmission 210 will occur after a second initial transmission 210. For example, the UA 110 and the access device 120 would know that retransmission 220c will occur after initial transmission 210b.

In an embodiment, a first HARQ process is reserved for all initial transmissions 210 until the UA 110 and the access device 120 become aware that a retransmission 220 associated with a first initial transmission 210a will occur after a second initial transmission 210b. At that time, the UA 110 and the access device 120 can agree to follow a rule stating that a second HARQ process will be used for the second initial transmission 210b. In this way the UA 110 and the access device 120 can appropriately link retransmissions 220 associated with the first initial transmission 210a to the first initial transmission 210a, and can appropriately link retransmissions 220 associated with the second initial transmission 210b to the second initial transmission 210b.

If the total number of retransmissions 220 associated with an initial transmission 210 is limited to three, initial transmissions 210 that occur after the second retransmission 220c can revert to using the first HARQ process. This allows the second HARQ process to be used on a temporary basis only when the rare case occurs of a third retransmission 220c occurring after a second initial transmission 210b. Data throughput can therefore be increased compared to the case where a second HARQ process is reserved throughout a session between the UA 110 and the access device 120.

Figure 2:
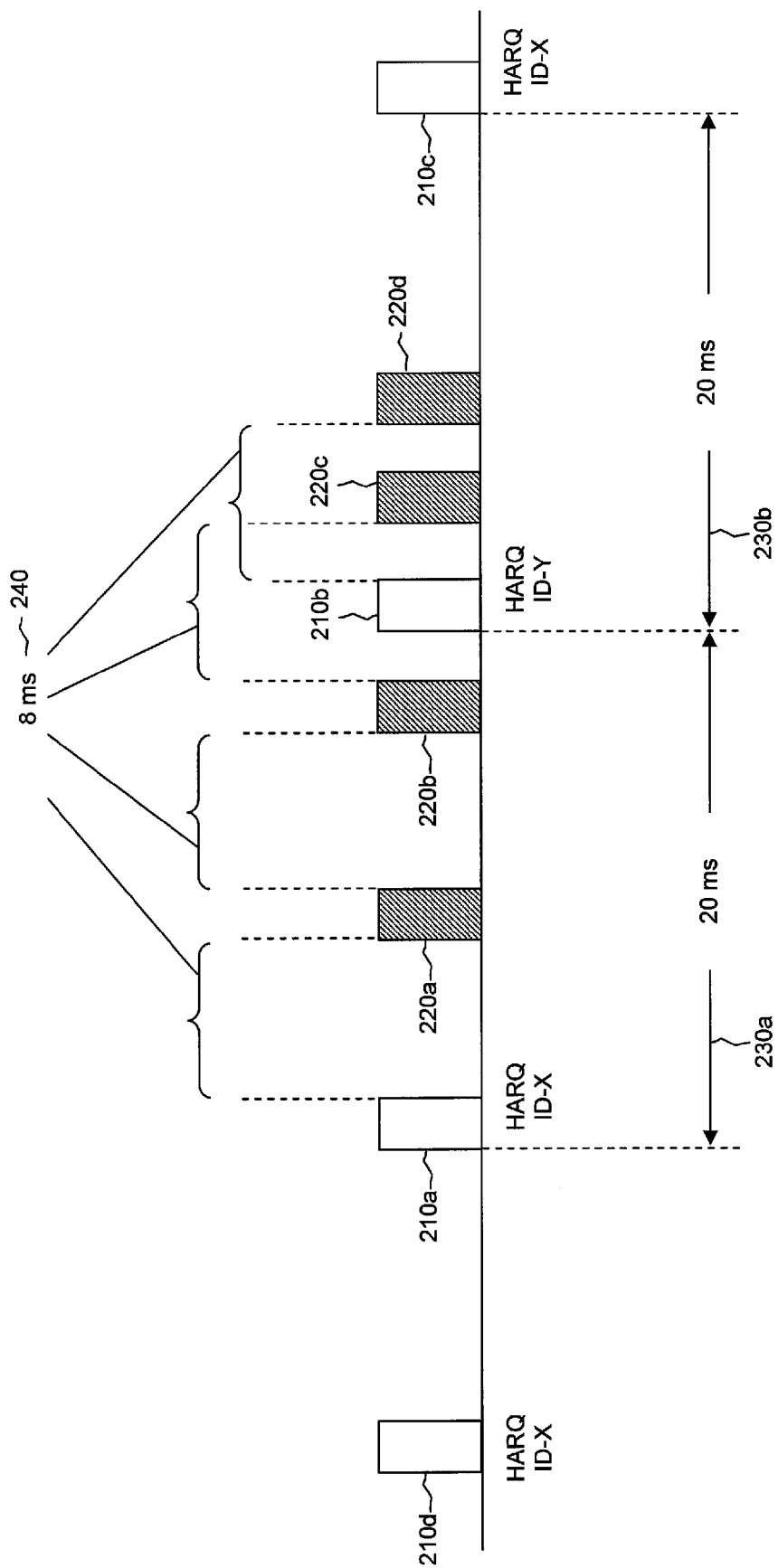
FIG. 2 is an alternative illustration of data transmissions and retransmissions according to an embodiment of the disclosure.

An example of this embodiment is illustrated in FIG. 2. A first HARQ process, referred to here as HARQ ID-X, is reserved for the initial transmissions 210, including an initial transmission 210d that occurs before initial transmission 210a. As in FIG. 1, initial transmission 210a is unsuccessful, and three retransmissions 220 of initial transmission 210a occur, with the third retransmission 220c occurring after a second initial transmission 210b. Since, in this case, the packet arrival interval is 20 milliseconds and the retransmission time is 8 milliseconds, the UA 110 and the access device 120 are both aware that retransmissions 220a and 220b will fall in the first packet arrival interval 230a and that retransmission 220c will fall in the second packet arrival interval 230b. In other embodiments, other packet arrival intervals 230 and retransmission times 240 could be used that would cause retransmissions 220a and 220b to fall in the first packet arrival interval 230a and retransmission 220c to fall in the second packet arrival interval 230b.

When the UA 110 is unsuccessful in decoding the error correction bits in the second retransmission 230b, the UA 110 sends a NACK message to the access device 120. At that time, the UA 110 and the access device 120 become aware that the third retransmission 220c will occur after the second initial transmission 210b and agree that a second HARQ process will be reserved for the second initial transmission 210b and any retransmissions 220 that might occur for the second initial transmission 210b. The second HARQ process is referred to here as HARQ ID-Y. If a retransmission 220d associated with the second initial transmission 210b occurs, the UA 110 and the access device 120 will both know to use HARQ ID-Y to associate the retransmission 220d with the second initial transmission 210b. In other words, when the UA 110 receives both retransmission 220c and retransmission 220d during packet arrival interval 230b, the UA 110 will know that retransmission 220c is associated with the first initial transmission 210a and that retransmission 220d is associated with the second initial transmission 210b.

Since the UA 110 and the access device 120 previously agreed that the number of retransmissions 220 for an initial transmission 210 would be limited to three, the UA 110 and the access device 120 are aware that no more retransmissions 220 associated with the first initial transmission 210a will occur. Therefore, HARQ ID-X is no longer needed at this point to associate retransmissions 220 to the first initial transmission 210a. HARQ ID-X can therefore be used by initial transmission 210c and any subsequent initial transmissions 210, and HARQ ID-Y can be released for other purposes. In this way, HARQ ID-Y can be used for only a brief period of time and only on rare occasions, thus increasing overall data throughput compared to the case where two HARQ processes are reserved throughout a session.

The identifier for HARQ ID-Y can be assigned in one of several different ways. In one embodiment, HARQ ID-Y is simply HARQ ID-X+1. For example, if HARQ ID-X is 3, HARQ ID-Y would be 4. In another embodiment, HARQ ID-Y is HARQ ID-X+N, where N is an integer that is explicitly or implicitly assigned by the access device 120. For example, if HARQ ID-X is 5 and the access device 120 assigns a value of 2 to N, the UA 110 and the access device 120 would both be aware that HARQ ID-Y is 7.

In another embodiment, the UA 110 and the access device 120 agree that HARQ ID-Y will be the next HARQ process that is available at the time when it becomes apparent that a third retransmission 220 will occur after a second initial transmission 210. That is, the UA 110 and the access device 120 are both aware of which HARQ processes are in use by other UAs and which HARQ processes are not being used, and can use the next unused HARQ process in the sequence of HARQ processes. For example, if the UA 110 and the access device 120 are using HARQ process 2 and are aware that HARQ processes 3 and 4 are being used by other UAs but that HARQ process 5 is not being used, the UA 110 and the access device 120 will use HARQ process 5.

In another embodiment, the access device 120 assigns a value to HARQ ID-Y via radio resource control signaling at the time of session setup, but the HARQ ID-Y process is used only if needed. That is, when a session is being set up between the UA 110 and the access device 120, the access device 120 reserves HARQ ID-X and specifies the HARQ ID-Y process that will be used if a third retransmission 220 occurs after a second initial transmission 210. When such a situation occurs, the UA 110 and the access device 120 know that HARQ ID-Y will be reserved at that time and will use HARQ ID-Y to associate the second initial transmission 210 with any of its retransmissions.

Figure 3:
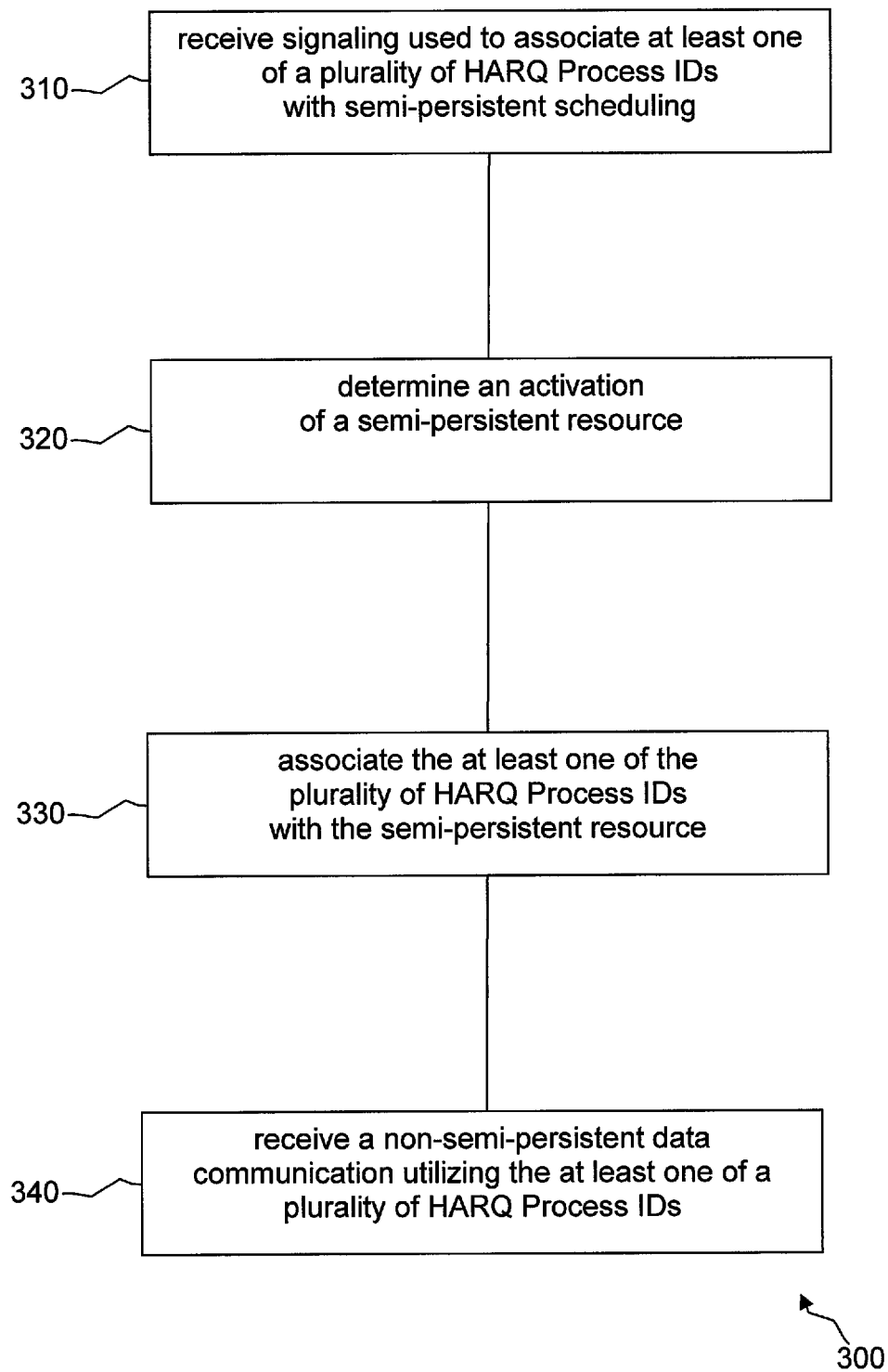
FIG. 3 is a diagram of a method for associating initial transmissions and retransmissions in semi-persistent scheduling according to an embodiment of the disclosure.

FIG. 3 illustrates an embodiment of a method 300 for associating initial transmissions and retransmissions in semi-persistent scheduling. At block 310, a first initial transmission associated with a first assigned Hybrid Automatic Repeat Request (HARQ) process ID is provided. At block 320, a second initial transmission associated with a second assigned HARQ process ID is provided. At block 330, at least one retransmission associated with the first HARQ process ID is provided. In an embodiment, the second initial transmission occurs before the at least one retransmission, and the second assigned HARQ process ID is different from the first assigned HARQ process ID.

While the above discussion has focused on downlink communications from the access device 120 to the UA 110, it should be understood that this disclosure could also apply to uplink communications from the UA 110 to the access device 120.

Figure 4:
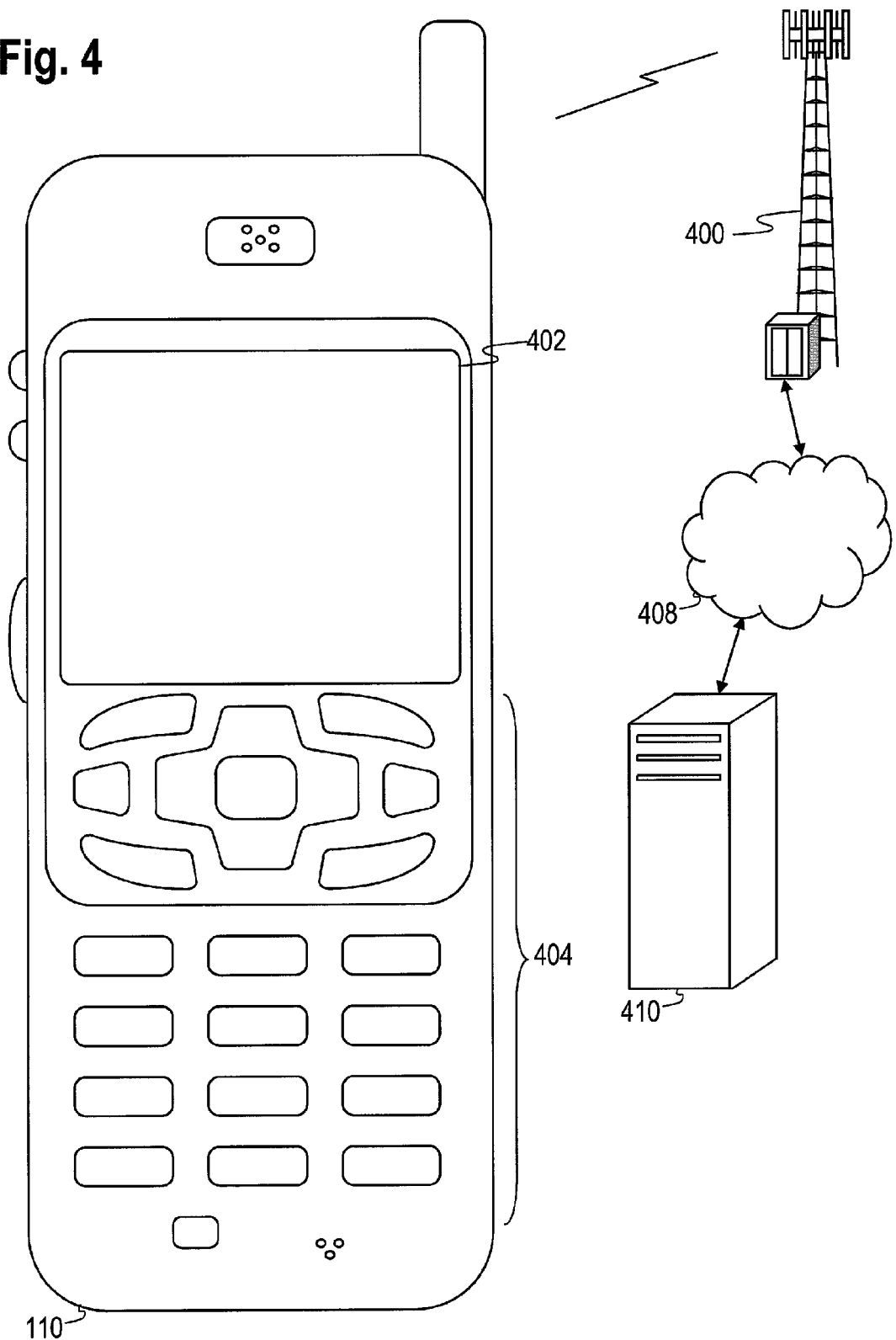
FIG. 4 is a diagram of a wireless communications system including a user agent operable for some of the various embodiments of the disclosure.

FIG. 4 illustrates a wireless communications system including an embodiment of the UA 110. The UA 110 is operable for implementing aspects of the disclosure, but the disclosure should not be limited to these implementations. Though illustrated as a mobile phone, the UA 110 may take various forms including a wireless handset, a pager, a personal digital assistant (PDA), a portable computer, a tablet computer, or a laptop computer. Many suitable devices combine some or all of these functions. In some embodiments of the disclosure, the UA 110 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UA 110 may be a portable, laptop or other computing device. The UA 110 may also be a device, include a device, or be included in a device that has similar capabilities but that is not transportable, such as a fixed line telephone, a desktop computer, a set-top box, or a network node. The UA 110 may support specialized activities such as gaming, inventory control, job control, and/or task management functions, and so on.

The UA 110 includes a display 402. The UA 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 110 may present options for the user to select, controls for the user to actuate, and/or cursors or other indicators for the user to direct.

The UA 110 may further accept data entry from the user, including numbers to dial or various parameter values for configuring the operation of the UA 110. The UA 110 may further execute one or more software or firmware applications in response to user commands. These applications may configure the UA 110 to perform various customized functions in response to user interaction. Additionally, the UA 110 may be programmed and/or configured over-the-air, for example from a wireless base station, a wireless access point, or a peer UA 110.

Among the various applications executable by the UA 110 are a web browser, which enables the display 402 to show a web page. The web page may be obtained via wireless communications with a wireless network access node, a cell tower, a peer UA 110, or any other wireless communication network or system 400. The network 400 is coupled to a wired network 408, such as the Internet. Via the wireless link and the wired network, the UA 110 has access to information on various servers, such as a server 410. The server 410 may provide content that may be shown on the display 402. Alternately, the UA 110 may access the network 400 through a peer UA 110 acting as an intermediary, in a relay type or hop type of connection.

Figure 5:
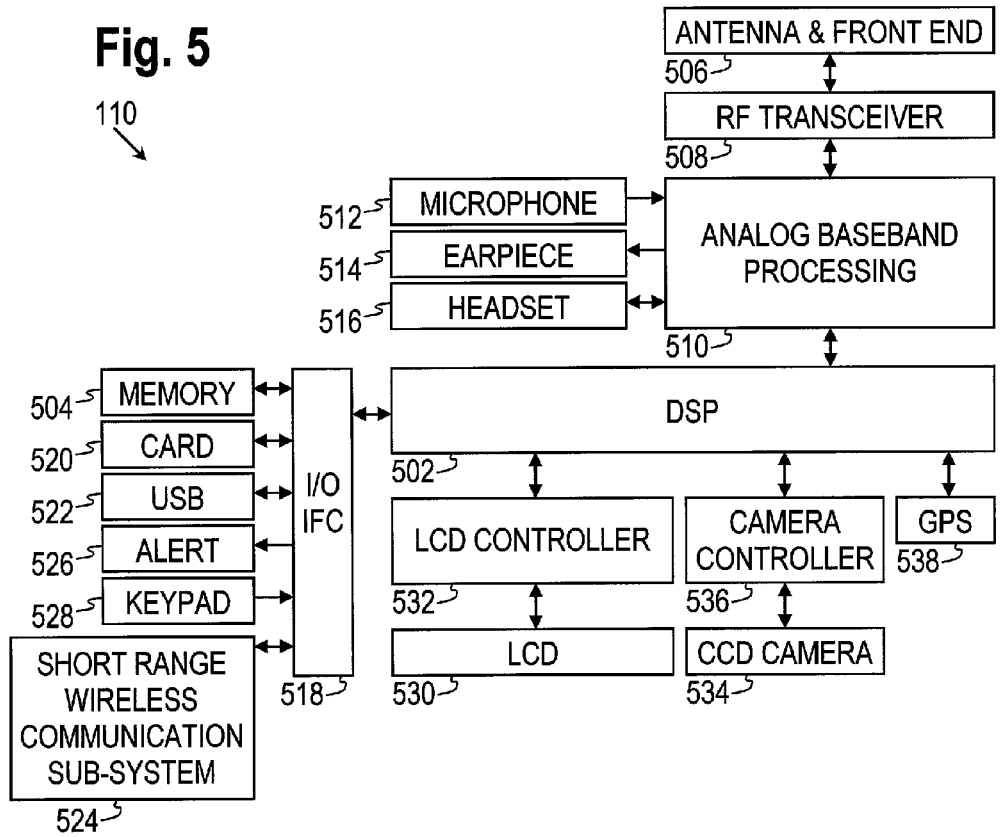
FIG. 5 is a block diagram of a user agent operable for some of the various embodiments of the disclosure.

FIG. 5 shows a block diagram of the UA 110. While a variety of known components of UAs 110 are depicted, in an embodiment a subset of the listed components and/or additional components not listed may be included in the UA 110. The UA 110 includes a digital signal processor (DSP) 502 and a memory 504. As shown, the UA 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UA 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UA 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UA 110 to send and receive information from a cellular network or some other available wireless communications network or from a peer UA 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UA 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UA 110 and may also enable the UA 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UA 110 to communicate wirelessly with other nearby mobile devices and/or wireless base stations.

The input/output interface 518 may further connect the DSP 502 to the alert 526 that, when triggered, causes the UA 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UA 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UA 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UA 110 to determine its position. Various other peripherals may also be included to provide additional functions, e.g., radio and television reception.

Figure 6:
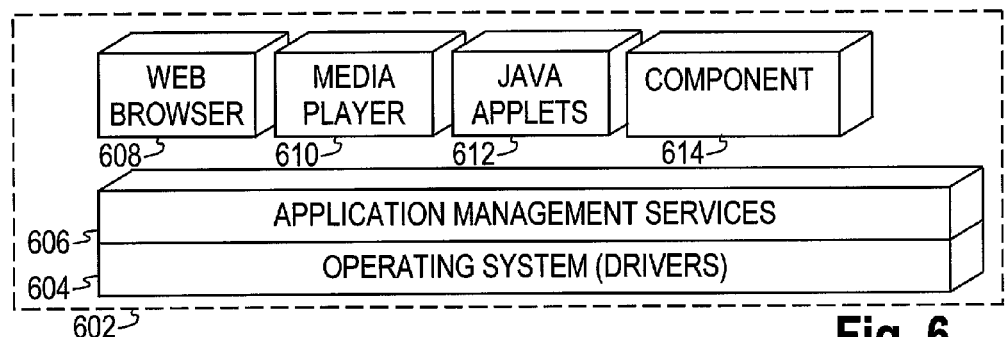
FIG. 6 is a diagram of a software environment that may be implemented on a user agent operable for some of the various embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the UA hardware with standardized interfaces that are accessible to application software. The operating system drivers 604 include application management services ("AMS") 606 that transfer control between applications running on the UA 110. Also shown in FIG. 6 are a web browser application 608, a media player application 610, and Java applets 612. The web browser application 608 configures the UA 110 to operate as a web browser, allowing a user to enter information into forms and select links to retrieve and view web pages. The media player application 610 configures the UA 110 to retrieve and play audio or audiovisual media. The Java applets 612 configure the UA 110 to provide games, utilities, and other functionality. A component 614 might provide functionality described herein.

Figure 7:
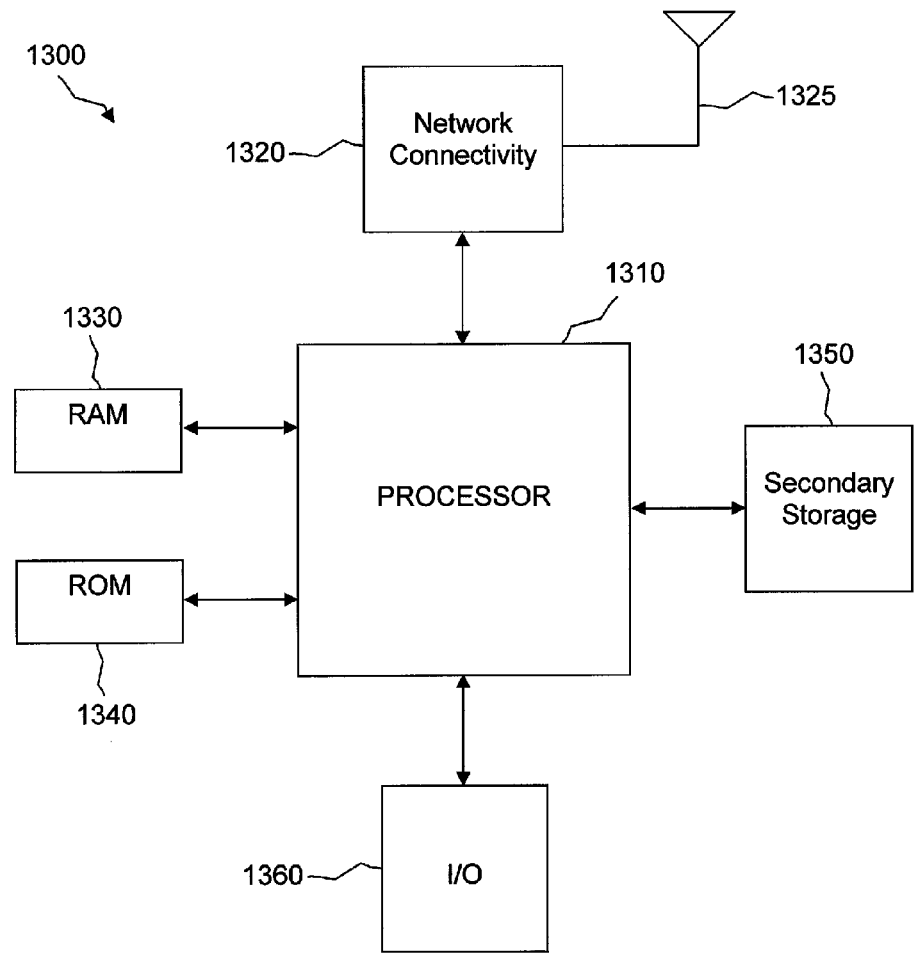
FIG. 7 is an illustrative general purpose computer system suitable for some of the various embodiments of the disclosure.

The UA 110 and other components described above might include a processing component that is capable of executing instructions related to the actions described above. FIG. 7 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 110, such as the display 402 and the input 404.

The following is an alternative discussion of the disclosure.

The HARQ process ID ambiguity has been discussed. The first issue is that when a DL SPS retransmission occurs, the UE needs to associate the possible retransmission (with HARQ Process ID via PDCCH signaling) with the initial transmission that is sitting in one of the HARQ buffers. However, the initial SPS transmission is not assigned in a PDCCH and, hence, has no associated HARQ process ID. This makes the linkage between the initial transmission and the retransmission difficult and makes soft combining difficult. A PDCCH is used to signal the UE that the retransmission is coming; however, it is not clear what HARQ process ID to use. The second issue, shown in the middle of FIG. 8a, occurs when a retransmission occurs after the next SPS transmission. The UE has no way of associating the retransmission with the correct transmission.

A simple general way to resolve these issues is to reserve the HARQ Processes for the DL SPS. In the following, the details are further analyzed.

The need to link the transmission with the retransmission is important since retransmissions happen on 10-15% of transmitted voice packets. A simple and robust way to resolve this is to reserve one of the HARQ processes in order to link the initial transmission and the HARQ retransmissions. A simple example of this would be to reserve HARQ process 1 (or other HARQ process) for SPS. No dynamically scheduled transmissions would be allowed to use HARQ process 1 when it is in use. When SPS is configured, the UE would automatically use process 1 for all transmission and retransmissions.

If two HARQ processes are reserved and are mapped to the SFN and/or subframe, then the second issue is also resolved. An example of this would be that HARQ process 1 and HARQ process 2 are used cyclically every 20 ms interval (so the HARQ usage pattern is 1, 2, 1, 2, 1, 2 . . . ).

However, this can be inefficient, especially considering that retransmissions continuing for more than a frame do not occur very often (on the order of 1% by system design). Assume the initial transmission is targeted for 10~15% BLER and a 20 ms packet arrival interval can accommodate 2 HARQ retransmissions in FDD case. The probability that the second case may occur is quite low (note that VoIP BLER is targeted for 1%). It may not be efficient to reserve another HARQ process to resolve the unlikely-to-happen second issue. Obviously, the HARQ process reservation will reduce the throughput of the UE since non-continuous transmission may occur when less than 8 HARQ processes are used due to the reservation.

On the other hand, if it is assumed the maximum number of HARQ retransmissions for the SPS is limited by 2 for FDD, then there may be no concern about the second issue at all and only one HARQ process is needed to be reserved for SPS as is shown in FIG. 8b. Therefore, given that one HARQ process is reserved for VoIP case, it is beneficial to explore how to avoid the reservation of another HARQ process just for the unlikely-to-happen second case.

Considering that both the UE and the eNB have exactly the same information on the SPS allocations, the UE can know that the ambiguity will occur when it transmits the NACK. It need only know the NACK to retransmission RTT and when it is sent. After the eNB receives the NACK, eNB can also be aware that ambiguity will occur when eNB sends the retransmission. Therefore, it is possible to design a rule to dynamically allocate the HARQ process ID that allows the UE to resolve the second case implicitly. Assume that the reserved HARQ process is X, and the dynamically allocated HARQ process is X+1 (but not reserved). Whenever the UE sends a NACK but the expected retransmission will cross the 20 ms boundary, the UE will assume the coming initial transmission over the SPS is using HARQ process X+1. After the eNB receives the NACK and becomes aware that the retransmission will cross the 20 ms boundary, the eNB will use the HARQ process ID X+1 (increment the ID Mod 8) to identify it as the initial transmission (also the corresponding retransmission for this transmission). Therefore, in the next 20 ms interval, if the UE receives a retransmission with HARQ process X, it is aware that this is for the first transmission; if the UE receives a retransmission with HARQ process X+1, it is aware that this is linked to the current (second) initial transmission. See FIG. 8c. Hence the assignment an SPS with HARQ process X, implies that HARQ process X+1 must be reserved for resolution of issue 2.

Note that in FIG. 8c, the HARQ process ID for transmission 7 will be revert to the reserved HARQ process ID=X for the normal use (only HARQ process X is reserved). Note that in this case even though transmission 6 needs more than 2 retransmissions (HARQ retransmissions for transmission 6 will cross the transmission 7 boundary), there is no ambiguity for the correct HARQ combining.

The above scheme, is an example in which the additional HARQ process is designated as X+1. There are several additional ways that the additional HARQ processes could be designated. For example, the additional HARQ process can be X+N, where N is implicitly/explicitly assigned by the eNB. Alternatively, the additional HARQ process can be next available HARQ process in the time that case 2 occurs. Note that eNB and the UE have the same information on the HARQ usage status. Alternatively, the additional HARQ process can be assigned by the eNB through RRC signaling. But this might be used only in case that case 2 occurs. Otherwise, it is not used by SPS (no reservation).

The above method relies on accurate reception of the ACK/NACK. If ACK→NACK or NACK→ACK errors occur, the eNB and the UE may have different understandings. However, this case occurs very rarely. As described above, the second case is very unlikely, and if the second case happens, the NACK/ACK error probability then equals to Prob (NACK/ACK error)*Prob(second case occur). Note that NACK/ACK error is in $10^{\wedge}(-3)$ to $10^{\wedge}(-4)$ range and second case occurs normally less than 5%. So the total probability is in the range of $10^{\wedge}(-5)$ to $10^{\wedge}(-6)$.

Using FIG. 8c as an example, if these errors do happen, for NACK→ACK error, eNB will stop the retransmission for transmission 5, and still implicitly allocate the HARQ process X to transmission 6. The UE will assume transmission 6 uses HARQ process X+1. If transmission 6 is successful, there is no problem. If the transmission 6 is in error, when the retransmissions come (so always HARQ process X), the UE will combine this one with transmission 5. The worst case is that the UE may lose one more voice packet. The error will not be propagated (since in transmission 7, both the eNB and the UE will simply apply HARQ process X). For ACK→NACK error, transmission 5 is successful and UE assumes transmission 6 uses the HARQ ID=X. If the transmission 6 is successful, there is no problem. If transmission 6 is in error, the eNB will send the retransmission with HARQ process ID=x+1. The UE will not try to perform HARQ combining due to the HARQ ID mismatch. Therefore, in the worst case, the UE may lose one more packet for transmission 6. The error will not be propagated (since in transmission 7, both the eNB and the UE will simply apply HARQ process X).

From the above analysis, it can be concluded that only one HARQ process needs to be reserved for the VoIP, and another HARQ process is implicitly/dynamically assigned to handle the unlikely-to-occur second case. In this way, only one HARQ is needed to be reserved. Compared with 2 HARQ process reservations, this increases the throughput by 17% for the UE. Therefore, in an embodiment, one HARQ process is reserved for the SPS. The ENB and the UE apply the above described implicit rule for the dynamic additional HARQ process usage to handle the second case for the SPS.

The signaling of the reserved HARQ process ID can be done either via PDCCH or via the RRC. When the signaling is done via PDCCH, whenever the DL PDCCH SPS activation is received by the UE, the assigned HARQ ID is the reserved ID X. During the silence period, no HARQ process ID is reserved. When the signaling is done via RRC, the eNB will signal the reserved HARQ process ID=X to the UE via the RRC signaling. The reserved HARQ process can be used by other applications during the silence period. The minor drawback is that certain flexibility may be lost due to the fixed reservation, but the impact may be negligible. However, this may also constrain the code space usage for the DL SPS activation via PDCCH (hence reduce the false detection for DL SPS activation).

Due to simplicity and robustness, the signaling of the reserved HARQ process via the RRC signaling may be preferable. Therefore, in an embodiment, RRC signaling is used to indicate the reserved HARQ process ID.

In order to make it possible for the reserved HARQ process for the SPS to be used by other applications during the silence period, the following alternatives might be considered: when the DL SPS resource is released (implicitly/explicitly by the eNB), other traffic can start to use the reserved HARQ process; and when the DL SPS activation (over PDCCH) is sent, the HARQ process might be reserved again (other traffic cannot use the same HARQ process).

The following 3rd Generation Partnership Project (3GPP) Technical Specifications (TS) are incorporated herein by reference: TS 36.321, TS 36.331, and TS 36.300.

In an embodiment, a system for semi-persistent scheduling is provided. The system includes a component configured to provide a first initial transmission associated with a first assigned Hybrid Automatic Repeat Request (HARQ) process ID, to provide a second initial transmission associated with a second assigned HARQ process ID, and to provide at least one retransmission associated with the first HARQ process ID. The second initial transmission occurs before the at least one retransmission, and the second assigned HARQ process ID is different from the first assigned HARQ process ID.

In an alternative embodiment, a method for associating initial transmissions and retransmissions in semi-persistent scheduling is provided. The method includes providing a first initial transmission associated with a first assigned Hybrid Automatic Repeat Request (HARQ) process ID. The method further includes providing a second initial transmission associated with a second assigned HARQ process ID. The method further includes providing at least one retransmission associated with the first HARQ process ID. The second initial transmission occurs before the at least one retransmission, and the second assigned HARQ process ID is different from the first assigned HARQ process ID.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment in a wireless communication system, the user equipment configured to:
   receive a first initial transmission associated with a first Hybrid Automatic Repeat Request (HARQ) process; and
   receive a second initial transmission associated with a second HARQ process,
      wherein when the second initial transmission occurs after at least one retransmission associated with the first HARQ process, the second HARQ process is assigned a second HARQ process ID that is the same as a first HARQ process ID assigned to the first HARQ process, and when the second initial transmission occurs before the at least one retransmission, the second HARQ process ID that is assigned to the second HARQ process is different from the first HARQ process ID.

2. The user equipment of claim 1, wherein the second initial transmission occurs a predetermined amount of time after the first initial transmission.

3. The user equipment of claim 2, wherein the predetermined amount of time is twenty milliseconds after the first initial transmission.

4. The user equipment of claim 1, wherein the second HARQ process ID assigned to the second HARQ process is one greater than the first HARQ process ID assigned to the first HARQ process.

5. The user equipment of claim 1, wherein the second HARQ process ID assigned to the second HARQ process is the next available HARQ process ID in a sequence of HARQ process IDs.

6. The user equipment of claim 1, wherein the first HARQ process ID assigned to the first HARQ process is reserved by an access device and the access device informs the user equipment of information related to the first HARQ process ID assigned to the first HARQ process through radio resource control signaling, and wherein the access device designates the second HARQ process ID of the second HARQ process and informs the user equipment of the assigned second HARQ process ID of the second HARQ process through radio resource control signaling.

7. The user equipment of claim 1, wherein when the second initial transmission
    occurs before the at least one retransmission, and the second HARQ process is assigned the second HARQ process ID that is different from the first HARQ process ID, then the second HARQ process is used on a temporary basis only.

8. A method of wireless communication using semi-persistent scheduling, the method comprising:
    receiving at a user equipment a first initial transmission associated with a first Hybrid Automatic Repeat Request (HARQ) process; and
    receiving at the user equipment a second initial transmission associated with a second HARQ process,
        wherein when the second initial transmission occurs after at least one retransmission associated with the first HARQ process, the second HARQ process is assigned a second HARQ process ID that is the same as a first HARQ process ID assigned to the first HARQ process, and
        when the second initial transmission occurs before the at least one retransmission, the second HARQ process ID that is assigned to the second HARQ process is different from the first HARQ process ID.

9. The method of claim 8, wherein the second initial transmission occurs a predetermined amount of time after the first initial transmission.

10. The method of claim 9, wherein the predetermined amount of time is twenty milliseconds after the first initial transmission.

11. The method of claim 8, wherein the second HARQ process ID assigned to the second HARQ process is one greater than the first HARQ process ID assigned to the first HARQ process.

12. The method of claim 8, wherein the second HARQ process ID assigned to the second HARQ process is the next available HARQ process ID in a sequence of HARQ process IDs.

13. The method of claim 8, wherein the first HARQ process ID assigned to the first HARQ process is reserved by an access device and the access device informs the user equipment of information related to the first HARQ process ID assigned to the first HARQ process through radio resource control signaling, and wherein the access device designates the second HARQ process ID of the second HARQ process and informs the user equipment of the assigned second HARQ process ID of the second HARQ process through radio resource control signaling.

14. The method of claim 8, wherein when the second initial transmission occurs before the at least one retransmission, and the second HARQ process is assigned the second HARQ process ID that is different from the first HARQ process ID, then the second HARQ process is used on a temporary basis only.

15. A method of wireless communication that associates retransmissions with appropriate initial transmissions, the method comprising:
    assigning a first HARQ process ID to a first HARQ process that is associated with a first initial transmission; and
    assigning a second HARQ process ID to a second HARQ process that is associated with a second initial transmission,
        wherein when the second initial transmission occurs after at least one retransmission associated with the first HARQ process, the second HARQ process ID assigned is the first HARQ process ID, and
        when the second initial transmission occurs before the at least one retransmission, the second HARQ process ID assigned is different from the first HARQ process ID.

16. The method of claim 15, wherein the second initial transmission occurs a predetermined amount of time after the first initial transmission.

17. The method of claim 15, wherein the second HARQ process ID assigned to the second HARQ process is one greater than the first HARQ process ID assigned to the first HARQ process.

18. The method of claim 15, wherein the second HARQ process ID assigned to the second HARQ process is the next available HARQ process ID in a sequence of HARQ process IDs.

19. The method of claim 15, wherein the first HARQ process ID assigned to the first HARQ process is reserved by an access device and the access device informs a user equipment of information related to the first HARQ process ID assigned to the first HARQ process through radio resource control signaling.

20. The method of claim 15, wherein when the second initial transmission occurs before the at least one retransmission, and the second HARQ process is assigned the second HARQ process ID that is different from the first HARQ process ID assigned to the first HARQ process, then the second HARQ process is used on a temporary basis only.

* * * * *